United States Patent [19]

Ukita et al.

[11] Patent Number: 4,677,672

[45] Date of Patent: Jun. 30, 1987

[54] CONTINUOUS SPEECH RECOGNITION APPARATUS

[75] Inventors: Teruhiko Ukita, Fujisawa; Tsuneo Nitta, Yokohama, both of Japan

[73] Assignee: Tokyo Shibaura Denki Kabushiki Kaisha, Kawasaki, Japan

[21] Appl. No.: 563,505

[22] Filed: Dec. 20, 1983

[30] Foreign Application Priority Data

Dec. 28, 1982 [JP] Japan .................................. 57-227707

[51] Int. Cl.$^4$ ................................................ G10L 5/00
[52] U.S. Cl. ...................................... 381/43; 364/513.5
[58] Field of Search ..................................... 381/41–43; 364/513, 513.5

[56] References Cited

U.S. PATENT DOCUMENTS

| | | | |
|---|---|---|---|
| 4,156,868 | 5/1979 | Levinson | 381/43 |
| 4,286,115 | 8/1981 | Sakoe | 381/43 |
| 4,479,236 | 10/1984 | Sakoe | 381/43 |

OTHER PUBLICATIONS

IEEE Trans. Acoust. Sig. Speech Proc., vol. ASSP-30, No. 4, pp. 561–565; "Speaker Independent Connected Word Recognition Using a Syntax-Directed Dynamic Programming Procedure", Myers and Levinson, 1982.

*Primary Examiner*—E. S. Matt Kemeny
*Attorney, Agent, or Firm*—Oblon, Fisher, Spivak, McClelland & Maier

[57] ABSTRACT

A continuous speech recognition circuit has a data generating circuit for calculating feature pattern data each having N-frame feature parameter data of a plurality of word-periods and reference pattern data every time one-frame period has elapsed and for sequentially generating a maximal similarity data among the calculated similarity data, and a recognition circuit for detecting a series of continuous word-periods which gives the largest similarity sum within a speech interval in accordance with the similarity data from the data generating circuit and recognizing as effective word data the word series corresponding to the detected series of continuous word-periods. The similarity data in each word period is obtained by calculating partial similarity data between the feature parameter data of each frame and each reference parameter data and using the N partial similarity data obtained during the word-period.

4 Claims, 7 Drawing Figures

F I G. 3

| F | i / n | 1 | 2 | 3 | 9 | 10 |
|---|---|---|---|---|---|---|
| F1 | 1 | $S_{11}^1, \cdots, S_{15}^1$ | $S_{21}^1, \cdots, S_{25}^1$ | $S_{31}^1, \cdots$ | $\cdots, S_{95}^1$ | $S_{101}^1, \cdots, S_{105}^1$ |
| | 2 | $S_{11}^2, \cdots, S_{15}^2$ | $S_{21}^2, \cdots, S_{25}^2$ | $S_{31}^2, \cdots$ | $\cdots, S_{95}^2$ | $S_{101}^2, \cdots, S_{105}^2$ |
| | 3 | $S_{11}^3, \cdots, S_{15}^3$ | $S_{21}^3, \cdots, S_{25}^3$ | $S_{31}^3, \cdots$ | $\cdots, S_{95}^3$ | $S_{101}^3, \cdots, S_{105}^3$ |
| | 4 | $S_{11}^4, \cdots, S_{15}^4$ | $S_{21}^4, \cdots, S_{25}^4$ | $S_{31}^4, \cdots$ | $\cdots, S_{95}^4$ | $S_{101}^4, \cdots, S_{105}^4$ |

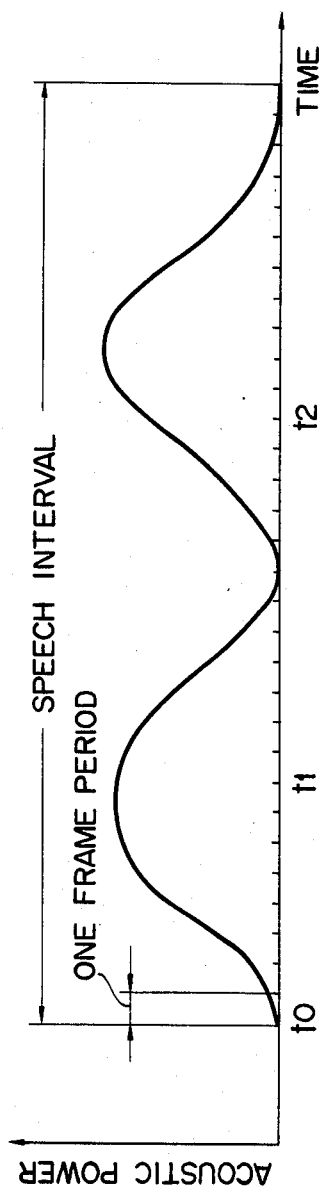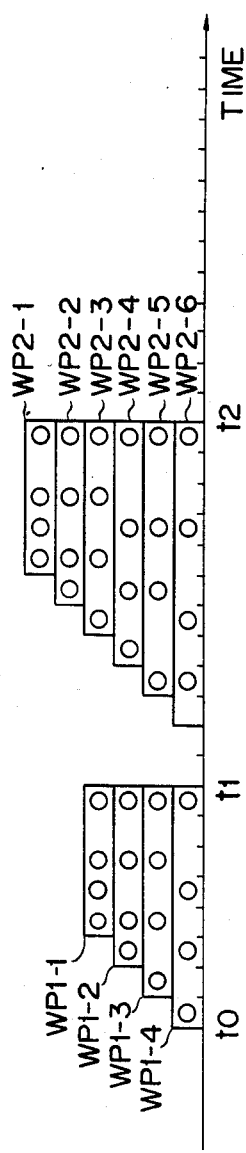
FIG. 5A
FIG. 5B 4,677,672

CONTINUOUS SPEECH RECOGNITION APPARATUS

BACKGROUND OF THE INVENTION

The present invention relates to a continuous speech recognition apparatus for recognizing a continuous speech.

It is very important to effectively recognize continuous natural speech with high reliability in a word-processor or speech input typewriter which deals with speech input data. Conventionally, a continuous speech recognition apparatus is known wherein a speech segment is used as the minimum unit of input speech to be recognized and a time-sequence of input speech feature parameters is converted to a series of phonemic symbols or segment lattice. However, coarticulation often occurs between two adjacent speech segments (phonemes) in a continuous speech, so that a given speech segment may have different feature parameters from those of an original speech segment. For this reason, it is very difficult to convert a continuous speech pattern to phonemic symbols with high precision.

Another continuous speech recognition apparatus is also known wherein a word unit is used as the minumum unit of input speech to be recognized each word unit is identified based on a sequence of input speech feature parameters, and a series of identified words is recognized as a sentence. According to this speech recognition apparatus, reference speech patterns indicating respective words are used. A feature parameter pattern indicating the input speech is compared with the corresponding reference speech pattern to calculate a similarity therebetween so as to recognize the input speech pattern in each word unit. Therefore, an influence due to the coarticulation described above can thus be substantially reduced. This recognition apparatus employs two word identification methods: one identification method wherein each word interval of an input speech is first detected to identify a word in the word interval; and the other identification method wherein a word is identified without detecting a word interval under the assumption that several words are present during the input speech interval. The word interval is determined by sequentially extracting feature parameters such as acoustic power or power spectrum of the input speech, and detecting a maximal or minimal point of change in the feature parameter. However, when words "I (ai)" and "eat (i:t)" are continuously pronounced to produce a speech input "I eat (ai:t)", the word interval of this speech cannot be correctly detected.

In the latter word identification method described above, reference speech patterns each having feature parameters of a plurality of frames are used to identify a corresponding one of words in the input speech pattern. For each frame, a distance between the feature parameters of the plurality of frames of the input speech and the reference speech pattern is calculated to detect a word giving a shortest distance in each frame. In this case, the distance between the feature parameter pattern of the input speech and the reference speech pattern can be calculated by a dynamic programming method, for example. All possible combinations of a series of words in the speech interval are made, and the input speech is then recognized by detecting one of the series of words giving a minimum total distance.

This word identification method is effective when a speaker is specified and word identification can be performed by using a small number of reference speech patterns. However, when a speaker is not specified, the input speech patterns of a word vary greatly from speaker to speaker. In order to process the speech data from nonspecified speakers, a great number of reference word patterns are required. In practice, it is impossible to prepare reference speech patterns for an indefinite number of nonspecified speakers. Therefore, it is impossible to accurately recognize the input speech patterns of an indefinite number of nonspecified speakers.

Speech data processing is recently proposed wherein a small number of reference patterns are used for the individual words, and speech data of a nonspecified speaker are processed utilizing a clustering technique. However, in this case, the recognition rate of a series of words is greatly decreased. Furthermore, the distance between the reference speech pattern and the feature parameter pattern of the input speech must be calculated in each frame, thus greatly increasing a total number of calculations. Therefore, it is very difficult to effectively recognize the input speech with high reliability.

SUMMARY OF THE INVENTION

It is an object of the present invention to provide a continuous speech recognition apparatus capable of effectively and reliably recognizing a continuous speech input of a nonspecified speaker.

In order to achieve the above object of the present invention, there is provided a continuous speech recognition apparatus comprising an acoustic analyzer for extracting feature parameter data of an input speech in each frame; a first memory for storing a plurality of reference pattern data each including reference parameter data of N frames; a partial similarity calculating circuit for calculating a partial similarity between the feature parameter data of each frame which is supplied from said acoustic analyzer and each reference parameter data stored in said first memory; a second memory for sequentially storing partial similarity data from said partial similarity calculating circuit for a predetermined number of frames; an operation circuit for calculating similarities between feature pattern data including N feature parameter data of the input speech and the reference pattern data on the basis of the N partial similarity data read out from said second memory which correspond to each of the reference pattern data and are present in at least one subperiod, and for generating largest similarity data among the calculated similarities; a third memory for storing the largest similarity data from said operation circuit, and reference pattern indication data and subperiod indication data which respectively indicate the reference pattern and the subperiod which are associated with the largest similarity data; and a recognition circuit for detecting a plurality of series of continuous subperiods in the speech interval and for recognizing the input speech on the basis of a series of reference pattern indication data corresponding to a series of continuous subperiods which provide the largest sum of similarity data associated with the continuous subperiods.

In the present invention, the partial similarity between the feature parameter data extracted in each frame and the reference parameter data of the reference pattern data is calculated during a one-frame period. The word similarity can be obtained in accordance with the partial similarity data previously calculated in association with the feature parameter data of a plurality of frames. Therefore, the number of calculations required to obtain the word similarity is greatly decreased.

BRIEF DESCRIPTION OF THE DRAWINGS

FIG. 3 shows part of a memory shown in FIG. 2 and storing partial similarlity data;

FIG. 5A is a graph for explaining the acoustic power of the input speech;

FIG. 5B shows word-periods obtained at given times in the speech interval; and

DETAILED DESCRIPTION OF THE PREFERRED EMBODIMENT

Figure 1:
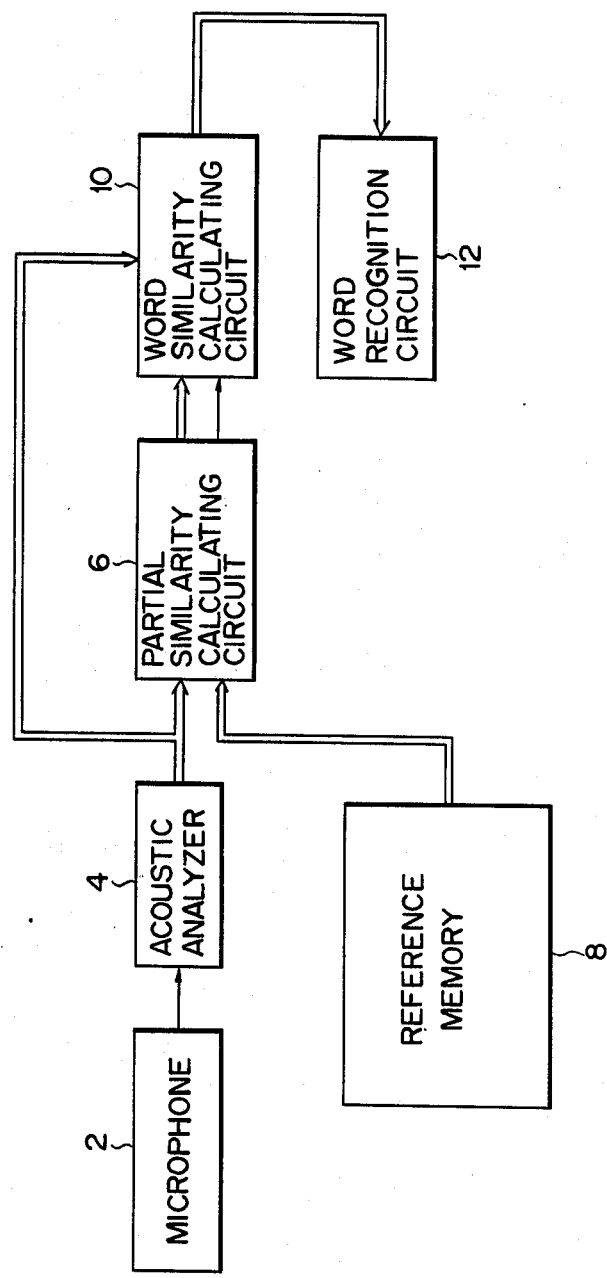
FIG. 1 is a block diagram of a continuous speech recognition apparatus according to a first embodiment of the present invention.

FIG. 1 shows a continuous speech recognition apparatus according to an embodiment of the present invention. This apparatus includes a microphone 2 for converting an input speech to an electrical speech signal; an acoustic analyzer 4 for extracting feature parameter data of the input speech for every one frame (e.g., 16 msec) in accordance with the electrical speech signal from the microphone 2; and a partial similarity calculating circuit 6 for calculating all similarity data between the feature parameter data of each frame supplied from the acoustic analyzer 4 and all feature parameter data stored in a reference memory 8. The acoustic analyzer 4 divides the frequency bandwidth of the speech signal into M (e.g., an integer within the range of 16 to 30) channels and generates M feature parameters by spectrum analysis using M band-pass filters. Each of reference pattern data stored in the reference memory 8 includes N-frame reference parameter data each having M acoustic parameters. The reference pattern data stored in the reference memory 8 are statistically obtained by processing the same kind of words generated from a number of nonspecified speakers. A number of variance-covariance matrices or correlation coefficient matrices corresponding to feature patterns of M×N for each word are calculated. J eigenvectors of these correlation coefficient matrices are sequentially extracted in the order from the largest eigenvalue. These J eigenvectors are used as reference pattern data. Therefore, the reference pattern of each word can be represented by J orthogonal feature vectors.

A multiple word similarity Si between a feature pattern data formed of the N-frame feature parameter data and the reference pattern data representing a word i is given by the following equation:

$$Si = \left\{ \sum_{j=1}^{J} (x, r_{ij})^2 \right\}^{\frac{1}{2}} \quad (1)$$

where x is the feature vector constituted by the N-frame feature parameter data, $r_{ij}$ is the jth eigenvector of the reference pattern data of the word i, and $(x, r_{ij})$ is the inner product of the feature vector x and the eigenvector $r_{ij}$.

In order to obtain the similarity of the input feature pattern data in accordance with equation (1), for example, subperiods each including a plurality of frame intervals are detected each time one frame interval is elapsed. N feature parameter data are selectively extracted from each subperiod. Similarities between the extracted feature parameter data and the reference parameter data of reference pattern data are sequentially calculated. However, in this case, since it is necessary to selectively extract the N-frame feature parameter data from various subperiods, a large-capacity buffer memory is required to store a plurality of feature parameter data generated during at least a predetermined interval. Even if such a plurality of feature parameter data can be stored, the similarity data during each subperiod cannot be obtained in a real-time manner due to the large number of calculations to be performed.

According to the present invention, every time the one-frame feature parameter data is generated from the acoustic analyzer 4, a partial similarity between the feature parameter data and each of the reference parameter data of the reference pattern data is calculated. The word similarity Si can be obtained in accordance with the partial similarity thus obtained.

Assume that one-frame feature parameter data CP [=(C1, C2, ..., Cm, ..., CM)] is generated from the acoustic analyzer 4. Also assume that the eigenvector $r_{ij}$ of the reference pattern data having the N-frame feature parameter data and representing the word i is given as follows:

$$r_{ij} = (r_{ij}^1, r_{ij}^2, \ldots, r_{ij}^n, \ldots, r_{ij}^N) \quad (2)$$

The reference parameter data $r_{ij}^n$ of the nth frame of the eigenvector $r_{ij}$ in equation (2) is given as follows:

$$r_{ij}^n = (r_{ij}^{n1}, r_{ij}^{n2}, \ldots, r_{ij}^{nm}, \ldots, r_{ij}^{nM}) \quad (3)$$

The partial similarity calculating circuit 6 calculates a partial similarity $S_{ij}^n$ between the feature parameter data CP from the acoustic analyzer 4 and the nth-frame reference parameter data of the jth eigenvector of the reference pattern data representing the word i and stored in the reference memory 8 in accordance with the following equation:

$$s_{ij}^n = \sum_{m=1}^{M} r_{ij}^{nm} C_m \quad (4)$$

Assume that a number I of categories of words is given as 10 so as to recognize a numeric value, and that M=10, N=4 and J=5. All the partial similarities of the one-frame feature parameter data CP are obtained by multiplication and addition by 2000 (=M×N×J×I) times. For example, when one frame interval is given as 16 msec, each multiplication/addition is assigned 8 μsec. Therefore, partial similarity calculation can be completed within each frame interval.

The partial similarity calculating circuit 6 calculates the N×J×I similarity data for the feature parameter data of each frame. These similarity data are sequentially supplied to a word similarity calculating circuit 10 within one frame interval. The word similarity calculating circuit 10 calculates the similarity Si between the feature pattern data of a predetermined number of frames within a subperiod which possibly includes a word in the speech interval and the reference pattern data on the basis of the partial similarity data obtained by the partial similarity calculating circuit 6, in accordance with the following equation:

$$Si = \left\{ \sum_{j=1}^{J} \left( \sum_{n=1}^{N} s_{ij}^{n} \right)^2 \right\}^{\frac{1}{2}} \tag{5}$$

On the other hand, a word recognition circuit 12 detects word-period series which are detected by the word similarity calculating circuit 10 and which each constitute a speech interval, and calculates a sum of similarities in all word-periods of each word-period series. Thereafter, the word recognition circuit 12 detects the word-period series which gives the largest similarity sum and recognizes as the effective word data the word series associated with the detected word-period series.

The word similarity calculating circuit 10 comprises a memory 10-1 for storing partial similarity data supplied from the partial similarity calculating circuit 6 for 10 frame intervals; a speech interval detecting circuit 10-2 for detecting a speech interval in accordance with the feature parameter data from the acoustic analyzer 4; an address designating circuit 10-3 for the memory 10-1; a control circuit 10-4 for controlling the operation of the memory 10-1 during the speech interval; and an operation circuit 10-5 for sequentially calculating word similarities in accordance with the partial similarity data selectively read out from the memory 10-1, and for sequentially supplying the operation results to a register 10-6.

The memory 10-1 may be constituted by a shift register for shifting and storing the partial similarity data supplied in each frame from the partial similarity calculating circuit 6 into frame areas F1 to F10. In each frame area of the memory 10-1, the I×N partial similarity data (I=10 and N=4 in this embodiment) which are supplied from the partial similarity calculating circuit 6 and which are associated with the J eigenvectors, respectively, are sequentially stored in a memory location (i,n) which is determined by the word category i and the number n of a frame in the N reference parameter data constituting the reference pattern.

For example, partial similarity data $s_{11}^1$, $s_{12}^1$, $s_{13}^1$, $s_{14}^1$ and $s_{15}^1$ (J=5) between the feature parameter data CP of a given frame and the reference parameter data of the first frame of word "0" are stored in a memory location (1,1) of the frame area F1 which is determined by i=1 and n=1. Similarly, partial similarity data $s_{11}^4$, $s_{12}^4$, $s_{13}^4$, $s_{14}^4$ and $s_{15}^4$ between the feature parameter data CP and the reference parameter data of the fourth frame of the word "0" are stored in a memory location (1,4). The partial similarity data which correspond to the feature parameter data CP and are generated from the partial similarity calculating circuit 6 are sequentially stored in the I×N (=40) memory locations of the frame area F1. In this case, the partial similarity data stored in the frame areas F1 to F9 are respectively shifted to the frame areas F2 to F10. The similarity calculation in this embodiment may be carried out in accordance with multiple similarity calculation method disclosed in U.S. Pat. No. 3,688,267, for example.

Figure 2:
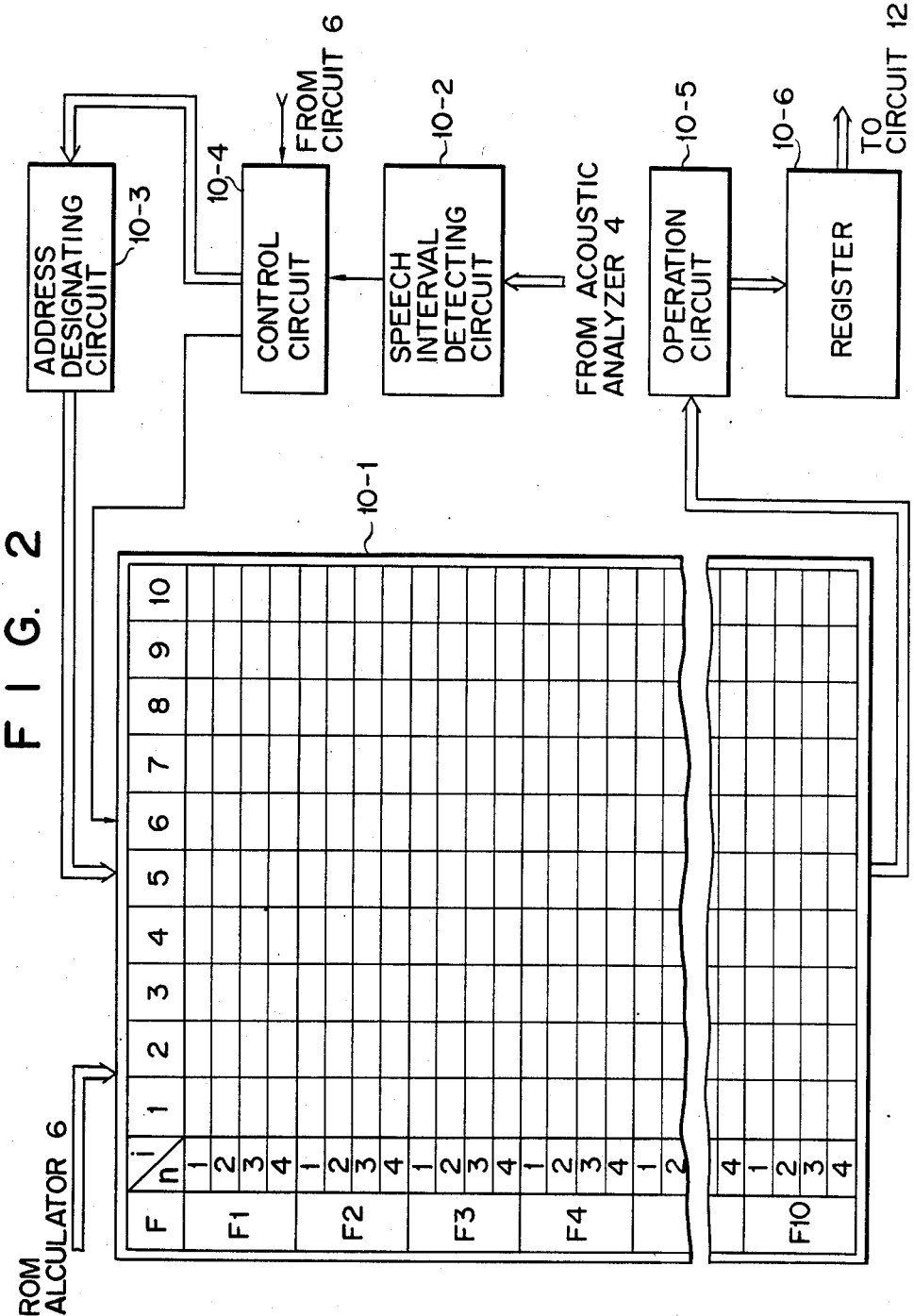
FIG. 2 is a block diagram of a word similarity calculating circuit shown in FIG. 1.

The operation of the continuous speech recognition apparatus shown in FIGS. 1 to 3 according to this embodiment of the present invention will now be described.

Figure 4:
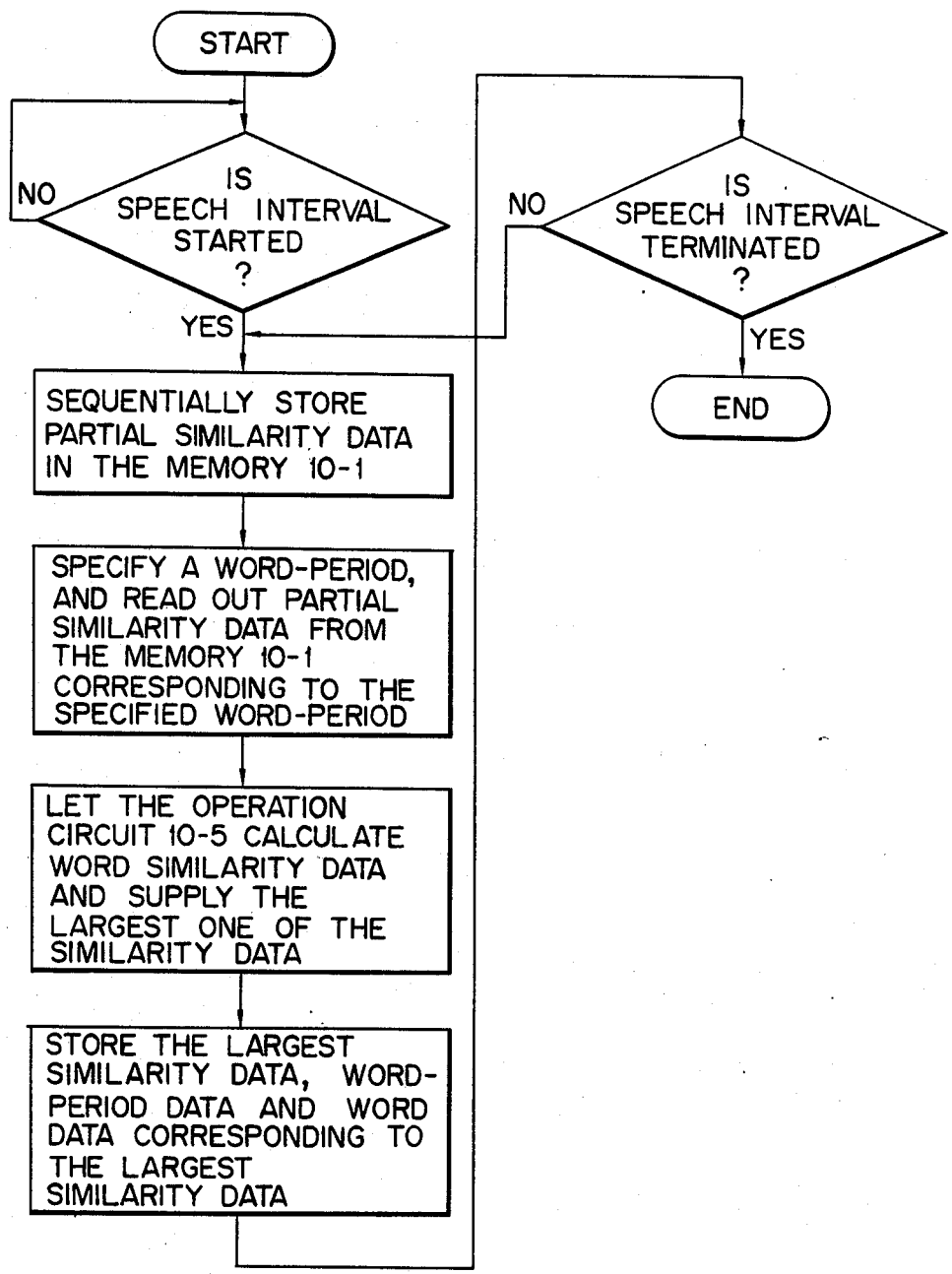
FIG. 4 is a flow chart for explaining the mode of operation of the continuous speech recognition apparatus shown in FIGS. 1 to 3.

As previously described, the partial similarity calculating circuit 6 calculates the partial similarity data between the feature parameter data of each frame and each reference parameter data in each reference pattern data for every 16 msec, and the calculated results are supplied to the word similarity calculating circuit 10. When the control circuit 10-4 of the word similarity calculating circuit 10 detects in response to the output signal from the speech interval detecting circuit 10-2 that the speech interval has started, the control circuit 10-4 sets the memory 10-1 in the write mode. As shown in the flow chart in FIG. 4, the partial similarity data from the partial similarity calculating circuit 6 are sequentially stored in the memory 10-1. The control circuit 10-4 sets the memory 10-1 in the read mode in response to the output signal generated by the partial similarity calculating circuit 6 each time all the partial similarity data between the feature parameter data of each frame and the I×N reference parameter data are calculated and stored in the memory 10-1. The control circuit 10-4 sequentially specifies a plurality of word-periods (6 in this case) each constituted by a corresponding number of frame intervals (e.g., 5 to 10 frame intervals) including the frame interval which is now obtained, so that the partial similarity data associated with the feature parameter data of predetermined frame among the plurality of frames included in the specified word-period are read out from the memory 10-1.

Assume that the speech signal having the acoustic power characteristic shown in FIG. 5A is supplied to the acoustic analyzer 4. In this case, at time t0, when the beginning of the speech interval is detected by the speech interval detecting circuit 10-2, the partial similarity data from the partial similarity calculating circuit 6 are sequentially stored in the memory 10-1. Thereafter, when the interval (i.e., 5-frame interval in this embodiment) corresponding to the shortest word-period has elapsed, the control circuit 10-4 specifies this word-period. For example, at time t1 when the 8-frame interval has elapsed arter time t0, the partial similarity data which are obtained during the 8-frame interval are stored in the frame areas F1 to F8 of the memory 10-1. In this case, the control circuit 10-4 sequentially specifies word-periods WP1-1 to WP1-4 respectively constituted by the 5 to 8 frames and obtained by the time t1 which is given as the reference time. Referring to FIG. 5B, four frames each indicated by a circle represent resampling frames used for word similarity calculation. The number of sampling frames is determined in accordance with the number of frames of the reference pattern data of the reference pattern data.

Assume that the 5-frame word-period is specified. In the 5-frame word-period, the first, third, fourth and fifth frames are specified as the resampling frames. The control circuit 10-4 specifies the frame areas F1, F3, F4 and F5 in the order named. The control circuit 10-4 supplies address data to the address designating circuit 10-3 to specify the frame area F1 and specifies the memory location (1,4) to read out the corresponding partial similarity data. The control circuit 10-4 subsequently specifies the memory location (1,3) of the frame area F3, the memory location (1,2) of the frame area F4 and the memory location (1,1) or the frame area F5 so as to read out the corresponding data therefrom. The operation circuit 10-5 calculates tne word similarity in accordance with equation (5) between the feature pattern data obtained at time t1 and the reference pattern data associated with the word "0" on the basis of the partial similarity data read out from the memory 10-1, and temporarily stores the calculated data. Subsequently, the control circuit 10-4 reads out the partial similarity data from the memory locations (2,4), (2,3), (2,2) and (2,1) of the respective memory areas F1, F3, F4 and F5. The operation circuit 10-5 calculates the word similarity in accordance with equation (5) between the feature pattern data obtained at time t1 and the reference pattern data associated with the word "1 " on the basis of the readout partial similarity data, and temporarily store the calculated data. In this manner, the word similarities between the feature pattern data of the feature parameter data of 4 frames out of 5 frames obtained at time t1 and the reference pattern data respectively representing the words "0" to "9 " are calculated. The largest one of 10 word similarity data which exceeds a predetermined value is stored in the register 10-6. In this case, the word data associated with the largest word similarity and the time data associated with the time t1 and the word-period length are stored together with the largest similarity data in the register 10-6. In this case, the word data and the similarity data can be dealt with as a series of data and the data representing the word-period length can be read out from the control circuit 10-4. For example, the data concerning the time t1 is given by a count signal from a counter (not shown) which is reset in response to the output signal representing the start of the speech interval and generated from the speech interval detecting circuit 10-2 and which counts an output signal which is generated from the partial similarity calculating circuit 6 each trme all the partial similarity data are stored in the memory 10-1.

The control circuit 10-4 then specifies the 6-frame word-period. In this case, in order to calculate the similarity of each word in accordance with equation (5), the control circuit 10-4 reads out the partial similarity data from the memory locations (i,4), (i,3), (i,2) and (i,1) of the respective frame areas F1, F3, F5 and F6. The operation circuit 10-5 calculates the similarities of the words in accordance with equation (5) on the basis of the partial similarity data read out from the memory 10-1 and supplies the largest similarity data to the register 10-6 in the same manner as described above.

The operation as described above is repeated. The control circuit 10-4 specifies the 7-frame word-period and the 8-frame word-period and supplies the largest similarity data, the word data and the time data of each word-period to the register 10-6. Thus, these data are stored in the register 10-6.

When all similarity calculations obtainable for all the word-periods at time t1 are completed, the control circuit 10-4 sets the memory 10-1 in the write mode. Thus, the partial similarity data of the next frame are stored in the frame area F1 of the memory 10-1.

At a predetermined time (e.g., time t2) after the partial similarity data of the 10-frame word-period (i.e., longest word-period) are written, as shown in FIG. 5B, the word-periods WP2-1 to WP2-6 respectively having 5 to 10 frames are sequentially specified, and the similarity calculations are performed in the same manner as described above. As a result. the largest similarity data, the word data and the time data of each word-period are stored in the register 10-6.

The same operation as described above is repeated for every frame until the signal representing the end of the speech interval is generated from the speech interval detecting circuit 10-2.

Figure 6:
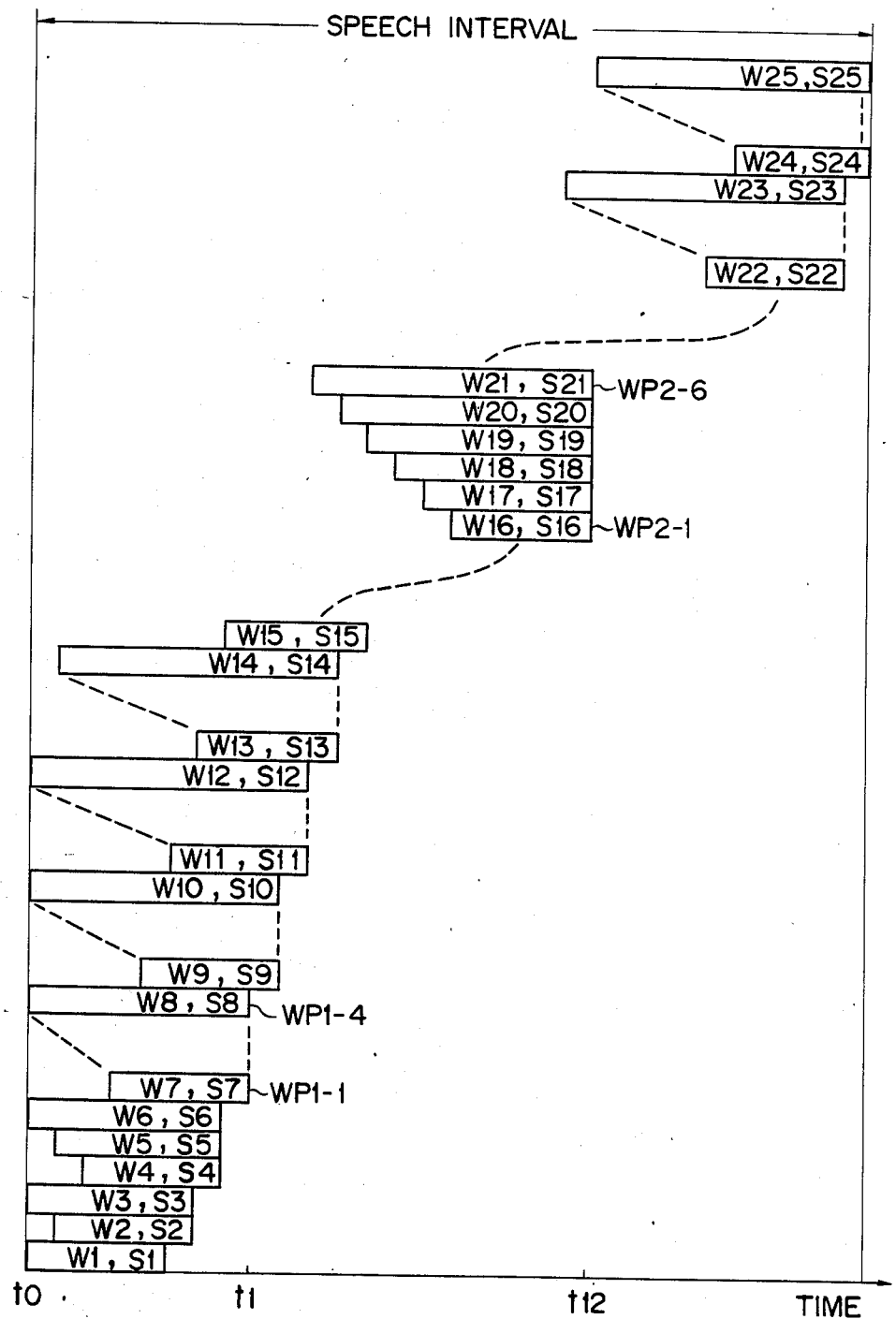
FIG. 6 shows an arrangement of word-periods represented by time data obtained by the word similarity calculating circuit shown in FIG. 2.

At the end of the speech interval, the word-period length data, the time data representing the end frame position of each of the word-periods, and similarity data are stored in the register 10-6, as shown in FIG. 6. The word recognition circuit 12 detects all word-period series which constitute the speech interval in accordance with the time data stored in the register 10-6. For example, as shown in FIG. 6, the word recognition circuit 12 detects the word-periods respectively associated with the word data W1, W11, W21 and W25, the word-periods respectively associated with the word data W3, W13, W20 and W25, the word-periods respectively associated with the word data W6, W15, W19 and W25, and the word-periods respectively associated with the word data W12, W21 and W25. Tne word recognition circuit 12 then calculates the sums of similarities (S1+S11+S21+S25), (S3+S13+S20+S25), (S6+S15+S19+S25) and (S12+S21+S25) in the word-periods of the respective word-period series. One of the word-period series having the largest sum of similarities is selected, and the word series corresponding to the largest word-period series is recognized as the effective word data. This word series recognition is performed in accordance with a dynamic programming method or parallel retrieval.

The present invention is exemplifed by the preferred embodiment described above but is not limited to the particular embodiment. In the above embodiment, by way of simplicity, the shortest word-period is constituted by 5 frames and the longest word-period is constituted by 10 frames. However, the shortest and longest word periods can have other number of frames, for example, a 10-frame period and a 30-frame period.

In the above embodiment, after the end of the speech interval, the word recognition, circuit 12 performs word series recognition in accordance with the word similarity data, the word data and the time data which are stored in the register 10-6. However, during the speech interval, the similarity data associated with the continuous word-periods can be sequentially calculated in accordance with the time data and the similarity data which are stored in the register 10-6 for every frame. In this case, a sum of similarity data in the word-period series within the speech interval is obtained for each frame, so that a substantially real-time recognition of the input speech pattern can be performed.

In addition to this modification, the partial similarity data can be represented by a Mahalanobis distance or a statistical discrimination function.

In the above embodiment, the minimum unit of speech recognition is the word, but the minimu unit may be extended to include a syllable or phrase The parameters M, N, I, J and F used in the above embodiment can be arbitrarily selected in accordance with the types of input speech to be recognized and the required recognition precision.

Furthermore, the speech interval detecting circuit 10-2 can be omitted. In this case, the control circuit 10-4 is operated during a time interval determined independently from the input speech.

What is claimed is:

1. A continuous speech recognition apparatus comprising:

an acoustic analyzer circuit for extracting feature parameter data of an input speech in each of frame;

first memory means storing a plurality of reference pattern data each including reference parameter data of N frames;

a partial similarity calculating circuit for calculating a partial similarity between the feature parameter data of each frame which is supplied from said acoustic analyzer circuit and each reference parameter data which is read out from said first memory means;

second memory means for sequentially storing partial similarity data from said partial similarity calculating circuit for a predetermined number of frames;

an operation circuit for calculating similarities between the feature pattern data including N feature parameter data of the input speech and the reference pattern data on the basis of the N partial similarity data which correspond to each of the reference pattern data and are present in at least one subperiod, and for selecting the largest one of the calculated similarity data;

third memory means for storing the largest similarity data from said operation circuit, and reference pattern indication data and subperiod indication data which respectively indicate the reference pattern and the subperiod which are associated with the largest similarity data; and a recognition circuit for detecting a plurality of series of continuous subperiods during the speech interval, calculating the sum of similarity data associated with each of said plurality of series of continuous subperiods and recognizing the input speech on the basis of a series of reference pattern indication data corresponding to a series of contiuuous subperiods with which the largest one of the sums of similarity data is associated.

2. An apparatus according to claim 1, wherein said data generation circuit further includes a speech interval detecting circuit for detecting the speech interval in accordance with feature parameter data from said acoustic analyzer circuit.

3. An apparatus according to claim 2, wherein said operation means includes a control circuit for setting said second memory means in a readout mode in response to an output signal supplied from said partial similarity calculating circuit each time partial similarity data for one frame are all stored in said second memory means, and an operation circuit for calculating the similarity between the feature pattern data and each of the reference pattern data and selecting the largest one of the similarity data, said control circuit setting said second memory means in a write-in mode after all the partial similarity data required for the similarity calculation by said operation circuit are read out from said second memory means.

4. An apparatus according to claim 1, wherein said operation means includes a control circuit for setting said second memory means in a readout made in response to an output signal supplied from said partial similarity calculating circuit each time partial similarity data for one frame are all stored in said second memory means, and an operation circuit for calculating the similarity between the feature pattern data and each of the reference pattern data and generating the largest one of the similarity data, said control circuit setting said second memory means in a write-in mode after all the partial similarity data required for the similarity calculation by said operation circuit are read out from said second memory means.

* * * * *